G. H. SAUNDERS.
CEREAL AND PROCESS OF MAKING THE SAME.
APPLICATION FILED APR. 16, 1920.

1,391,696. Patented Sept. 27, 1921.

Inventor
George H. Saunders

UNITED STATES PATENT OFFICE.

GEORGE HERBERT SAUNDERS, OF AKRON, OHIO, ASSIGNOR OF ONE-HALF TO ADDISON T. SAUNDERS, OF CHICOPEE, MASSACHUSETTS.

CEREAL AND PROCESS OF MAKING THE SAME.

1,391,696.  Specification of Letters Patent.  Patented Sept. 27, 1921.

Application filed April 16, 1920. Serial No. 374,458.

*To all whom it may concern:*

Be it known that I, GEORGE H. SAUNDERS, a citizen of the United States, and resident of Akron, Ohio, have invented certain new and useful Improvements in Cereals and Processes of Making the Same, of which the following is a specification.

My invention relates to cereal products or products prepared from wheat, oats, maize, rice, barley and in general all grains and amylaceous seeds or kernels. Its object is to provide products of this character which shall be ready for consumption as a palatable, readily-digestible and highly nutritious article of food either alone or when mixed with milk or cream, sweetened, or non-sweetened, or in soups and of great value for confectioners' use as a substitute for nuts.

I, jointly with William W. Saunders, took out a patent on the 26th of May, 1914, No. 1,097,882 which included the treatment of cereal grain by first soaking the grain and then frying it in oil, but it has been found that the use of oil is objectionable at times as it has a tendency to become rancid when the climatic conditions are unfavorable, and the use of oil also adds materially to the cost of the product.

In the process made the subject of this application I have aimed to overcome the difficulties above enumerated by the process now to be described and at the same time to secure all the advantages of the former product when the said product was made and used under the most favorable conditions.

Briefly, my invention consists in subjecting water-soaked grain to the action of so high a heat as to cause the quick conversion of the starch granules before a drying action can take place.

The accompanying drawings partly diagrammatic and in section, show part of an apparatus for carrying out the process.

Figure 1:
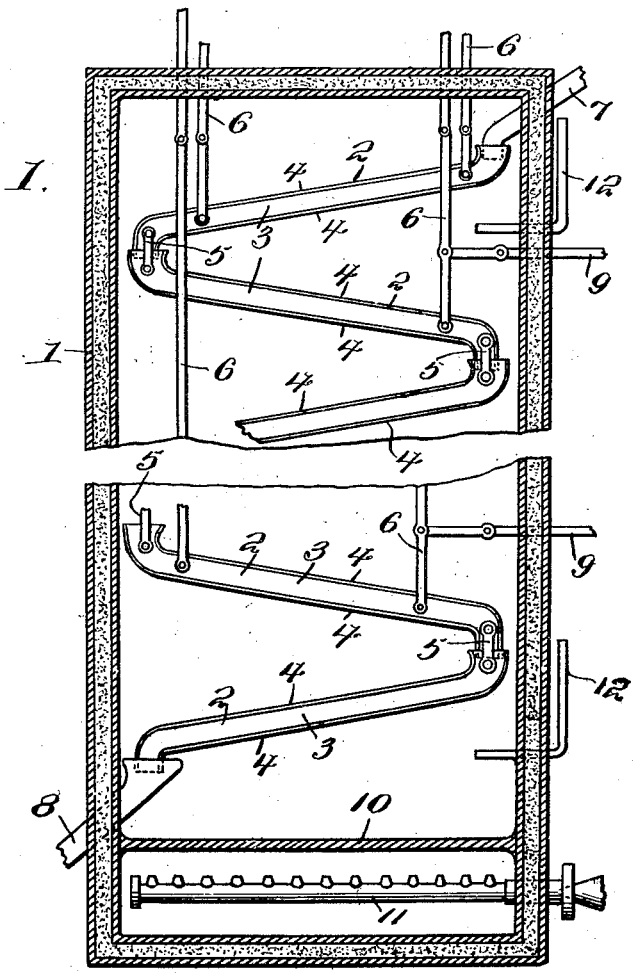
Figure 1 shows a cooking cabinet partly in section and partly in elevation.
Figure 2:
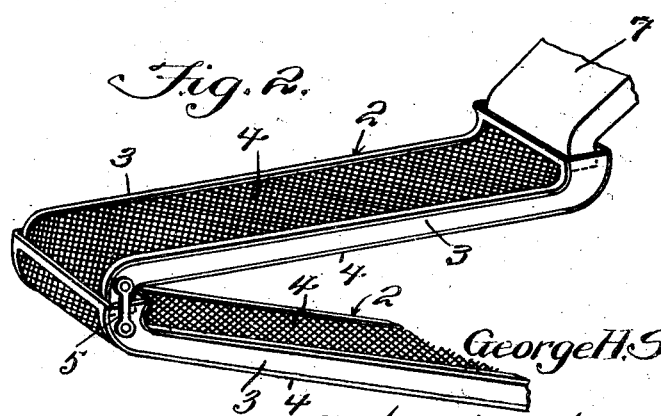
Fig. 2 shows a detail view of the inclined screens used.

The cooking cabinet preferably comprises inner and outer walls of sheet metal with a filling between of insulating material, such as asbestos.

Inclined screens 2 are provided within the cabinet comprising shallow sides 3, 3 of metal, with tops and bottoms of perforated metal or wire screen 4, 4. The upper end of each screen section is adapted to receive loosely the lower end of the next member above as shown. These separate screen sections are held in proper juxtaposition by links 5, 5 and suspension rods 6, 6, the latter being controlled from outside the cabinet to alter the pitch of the screen sections which are by the arrangement shown loosely connected.

7 is a feed pipe through which the grain to be heated enters to the upper section 2 of the screens and after passing through the screens, the heated material is discharged through the pipe 8.

It will be understood that the screens form practically a flattened tunnel of perforated or meshed metal, through which the heat freely passes and makes a continuous course for the grain from the point of feed to that of discharge.

The speed of the movement of the grain and its distribution in the form of a thin moving layer upon the bottoms of the screens is effected and regulated by the pitch of the screen sections and by the degrees of agitation imparted to them by suitable shaking rods 9, 9 extending to the outside of the cabinet and actuated by any suitable mechanical means.

10 is a false bottom in the cabinet, while 11 is a heating element, preferably a multiple-jet gas burner, 12, 12 are thermometers for indicating the temperature in the cabinet, thus enabling proper control of the heat.

In carrying out my improved process, I preferably place the grain in suitable vats, and thoroughly covered with pure water, maintained at a temperature of approximately 90 to 130 degrees Fahrenheit for a period of twenty-four to forty-eight hours, or at a lower temperature for a greater length of time, during which period the grain is frequently turned or stirred to insure uniform absorption of water to the point of saturation.

The water is now drawn from the vat, the grain is flooded with fresh, pure water, the grain being constantly agitated to remove any impurities that may have adhered to the surface of the grain. The water is now drawn off and the grain allowed to thoroughly drain after which it is moved from the vat and subjected to a heat of approximately 200 degrees Fahrenheit for just a sufficient time to drive off surface moisture, being, for this step preferably distributed in thin layers upon extended surfaces such as conveyer belts of metal gauze.

It should be understood that my purpose in saturating the grain with water, previous to its being subjected to heat, is to insure thorough steam cooking, and to produce a condition of crispness and fragility, entirely overcoming all tendency to toughness or sponginess under any conditions and converting the starch granules into a slightly enlarged and easily crushable condition.

When surface dry, the grain is next fed into the heating cabinet, Fig. 1, which has been brought to the desired temperature by the means described above. The heat is maintained during the passage of the grain from the feed 7 to the discharge 8 through inclined screens 2, the latter being meanwhile agitated by the means described.

During this step the moisture escaping from the grain in the form of steam is carried out of the cabinet by suitable vents and exhaust.

On discharging from the cabinet the grain is preferably received upon conveyer belts traveling through an area of gentle heat for a period sufficient to eliminate any remaining aqueous moisture, and is then discharged into suitable receptacles.

It will be understood that the process may be performed by any suitable apparatus or means. For instance, the cooking cabinet may be replaced by such a device as an extended conveyer belt of wire gauze traveling over heated plates and inclosed in a low housing of metal and insulating material and fitted at short intervals with vertical blades which serve to divide the space within the housing into moving compartments or divisions, thereby insuring a more equal division and distribution of the grain in a thin layer under agitation of the belt.

What I claim is:

1. As a new article of manufacture, an edible cereal product consisting of whole grain having its natural surface dry-parched and its interior body portion steam cooked said grain being slightly expanded.

2. As a new article of manufacture, an edible product consisting of a cereal grain having a dry parched surface and its interior body portion steam cooked, said grain being slightly expanded.

3. The process of treating cereal grain consisting in soaking it in water, subjecting the same to high heat to cause quick conversion of the starch, before the drying out action of the interior of the grain can take place and also to cause dry parching of the surface of the grain, substantially as described.

4. The process of treating cereal grain consisting in soaking it in water, driving off the surface moisture by heat without drying the interior and without converting the starch, then subjecting it to high heat to cause quick conversion of the starch, before the drying out action of the interior can take place, and also to cause parching of the previously dried surface, and thereafter drying the interior of the grain, substantially as described.

In testimony whereof, I affix my signature.

GEORGE HERBERT SAUNDERS.